(12) United States Patent
Hwang

(10) Patent No.: US 9,879,827 B2
(45) Date of Patent: Jan. 30, 2018

(54) COMPRESSOR SYSTEM

(71) Applicant: Hanwha Techwin Co., Ltd., Changwon-si (KR)

(72) Inventor: Yeongsoo Hwang, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/821,262

(22) Filed: Aug. 7, 2015

(65) Prior Publication Data

US 2016/0273711 A1   Sep. 22, 2016

(30) Foreign Application Priority Data

Mar. 18, 2015 (KR) .................. 10-2015-0037303
Apr. 10, 2015 (WO) ................ PCT/KR2015/003602

(51) Int. Cl.
*F01K 25/08* (2006.01)
*F17C 7/04* (2006.01)

(52) U.S. Cl.
CPC .......... *F17C 7/04* (2013.01); *F17C 2221/033* (2013.01); *F17C 2227/0185* (2013.01); *Y02T 10/32* (2013.01)

(58) Field of Classification Search
CPC .... F02C 3/13; F02C 6/08; F02C 7/143; F02C 9/18; F05D 2270/101
USPC ................... 60/651, 650, 659, 682
See application file for complete search history.

(56) References Cited

U.S. PATENT DOCUMENTS

| | | | | |
|---|---|---|---|---|
| 3,699,681 | A * | 10/1972 | Frutschi | F02C 9/24 60/660 |
| 3,857,245 | A * | 12/1974 | Jones | F25J 1/0025 60/651 |
| 2008/0019842 | A1* | 1/2008 | Coates | B64D 13/06 417/2 |
| 2014/0075943 | A1 | 3/2014 | Jung et al. | |

FOREIGN PATENT DOCUMENTS

| | | | |
|---|---|---|---|
| JP | 2005-226561 A | 8/2005 | |
| JP | 2014-514486 A | 6/2014 | |
| KR | 20120069393 A * | 6/2012 | |
| KR | 20140052885 A * | 5/2014 | ......... F02M 21/0215 |
| WO | 2014/209029 A1 | 12/2014 | |

\* cited by examiner

*Primary Examiner* — Craig Schneider
*Assistant Examiner* — Angelisa L Hicks
(74) *Attorney, Agent, or Firm* — Sughrue Mion, PLLC

(57) ABSTRACT

A compressor system includes a first compressor having a first variable diffuser having a diffuser area; a second compressor having a second variable diffuser having a diffuser area; a third compressor configured to compress fluid discharged by the second compressor; a fourth compressor configured to compress fluid discharged by the third compressor; a fifth compressor configured to compress fluid discharged by the fourth compressor; a first channel configured to connect an outlet of the second compressor to an inlet of the third compressor; a first valve provided to the first channel; a second channel configured to connect the outlet of the second compressor to the inlet of the third compressor; a second valve provided to the second channel; a first intercooler; a second intercooler and a controller configured to control the first valve, the second valve, the first variable diffuser, and the second variable diffuser.

17 Claims, 6 Drawing Sheets

COMPRESSOR SYSTEM

CROSS-REFERENCE TO RELATED APPLICATIONS

This application claims priority from Korean Patent Application No. 10-2015-0037303, filed on Mar. 18, 2015, in the Korean Intellectual Property Office, and PCT/KR2015/003602, filed on Apr. 10, 2015, the disclosures of which are incorporated herein by reference in their entireties.

BACKGROUND

1. Field

Apparatuses consistent with exemplary embodiments relate to a compressor system, and in particular, to a compressor system that compresses boil-off gas into high-pressure gas through a five (5) or more-stage compression operation to provide high-pressure fuel to an engine of a liquefied natural gas (LNG) carrier.

2. Description of the Related Art

Liquefied natural gas (LNG) carriers are vessels that store and carry LNG in a liquid state in a LNG storage tank. LNG carriers are equipped with propulsion engines for voyage, and power-generation engines for supplying power to mechanical devices including compressors and pumps for vessels, and convenience facilities. Accordingly, a LNG supply system is used for LNG carriers to supply natural gas including methanol as a major component as an energy source for such engine for LNG carrier.

During a voyage on LNG carriers, LNG in an LNG storage tank is heated by external heat and continuously vaporized. Such gas that is vaporized from the LNG storage tank is called boil-off gas (BOG).

If the vaporized BOG is not appropriately treated, BOG may expand, leading to a higher pressure in the LNG storage tank. In the worst case, the LNG storage tank may be destroyed. Accordingly, a LNG supply system of a LNG carrier includes a compressor system that compresses BOG vaporized from a storage tank and supplies the compressed gas as fuel for propulsion of LNG carriers.

LNG carriers sail either in a laden state in which a storage tank is full of LNG or in a ballast state in which they carry only a minimum LNG for voyage after the delivery of LNG from a production area to a destination is completed.

When LNG carriers sail in the ballast state, external heat may be applied to BOG filling the space in a storage tank and as a result, the temperature of BOG rises.

In the related art, a compressor system constituting the LNG supply system for LNG carriers requires two (2) compressors. A compressor system of the related art using two compressors uses two (2)-stage low duty (LD) compressors having identical features that suck gas at an inlet temperature of −120 degrees, or three (3)-stage to four (4)-stage LD compressors that operate at an inlet temperature of −120 degrees to about +40 degrees and maintain a pressure of 6.5 barA (absolute pressure) required by an engine.

For example, KR 1257937 discloses a compressor system including a compressor that operates at an extremely low inlet temperature, and an LD compressor that operates at room temperature and extremely low temperatures. The compressor system supplies fuel gas having a pressure of 6.5 barA to an engine of a carrier. In the compressor system, however, a compressor suction pipe is needed to be equipped with an inlet chiller to counter to an increase in the temperature of BOG.

When LNG carriers sail in the ballast state, BOG is quickly heated and the temperature thereof exceeds −120 degrees. Accordingly, the inlet chiller of the compressor suction pipe is operated to maintain the inlet temperature of a compressor to be −120 degrees and such a compressor system is inefficient in terms of energy use and the environment.

SUMMARY

Exemplary embodiments provide a compressor system that compresses boil-off gas generated in a storage tank of liquefied natural gas (LNG) and supplies the compression gas to an engine as fuel.

Exemplary embodiments provide a compressor system that compresses boil-off gas to a pressure level that is suitable for an engine of a LNG carrier and supplies the compression gas to an engine as fuel.

Exemplary embodiments provide a compressor system that efficiently compresses boil-off gas in a temperature range of extremely low temperatures to room temperature even without using a separate cooling device.

Additional aspects will be set forth in part in the description which follows and, in part, will be apparent from the description, or may be learned by practice of the presented exemplary embodiments.

According to an aspect of an exemplary embodiment, there is provided a compressor system including: a first compressor configured to include a first variable diffuser, of which an area varies depending on an external signal, and to compress boil-off gas; a second compressor configured to include a second variable diffuser, of which an area varies depending on an external signal, and to compress fluid discharged by the first compressor; a third compressor configured to compress fluid discharged by the second compressor; a fourth compressor configured to compress fluid discharged by the third compressor; a fifth compressor configured to compress fluid discharged by the fourth compressor; a first channel configured to connect an outlet of the second compressor to an inlet of the third compressor; a first valve provided to the first channel and configured to open or close the first channel in response to an external signal; a second channel configured to connect the outlet of the second compressor to the inlet of the third compressor; a second valve provided to the second channel and configured to open or close the second channel in response to an external signal; a first intercooler provided to the second channel and configured to cool fluid passing through the second channel; a second intercooler provided between an outlet of the fourth compressor and an inlet of the fifth compressor and configured to cool fluid; and a controller configured to control the first valve, the second valve, the first variable diffuser, and the second variable diffuser.

The compressor system may further include a first surge channel connecting the inlet of the third compressor and an inlet of the first compressor, and a first surge valve provided to the first surge channel and configured to open or close the first surge channel.

The compressor system may further include a second surge channel connecting an outlet of the fifth compressor to the inlet of the third compressor, and a second surge valve provided to the second surge channel and configured to open or close the second surge channel.

The compressor system may further include an aftercooler connected to the outlet of the fifth compressor to cool fluid discharged by the fifth compressor.

The compressor system may further include a sensor configured to detect the temperature of boil-off gas supplied to the first compressor.

The compressor system may further include a sixth compressor configured to compress fluid discharged by the fifth compressor.

According to an aspect of another exemplary embodiment, there is provided a compressor system including: a first compressing device including a first compressor including a first variable diffuser, of which an area is variable depending on an external signal, and configured to compress boil-off gas, a second compressor including a second variable diffuser, of which an area is variable depending on an external signal, and configured to compress fluid discharged by the first compressor, a third compressor, a fourth compressor, and a fifth compressor which are sequentially disposed in series in this stated order in a downstream of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and cooling fluid, and a second intercooler provided between an outlet of the fourth compressor and an inlet of the fifth compressor and cooling fluid; a second compressing device including: a sixth compressor including a third variable diffuser, of which an area is variable depending on an external signal, and configured to compress boil-off gas, a seventh compressor including a fourth variable diffuser, of which an area is variable depending on an external signal, and configured to compress fluid discharged by the sixth compressor, an eighth compressor, a ninth compressor, and a tenth compressor which are sequentially disposed in series in this stated order in a downstream of the seventh compressor, a third valve configured to open or close a third channel connecting an outlet of the seventh compressor to an inlet of the eighth compressor, a fourth valve configured to open or close a fourth channel connecting the outlet of the seventh compressor to the inlet of the eighth compressor, a third intercooler provided to the fourth channel and cooling fluid, and a fourth intercooler provided between an outlet of the ninth compressor and an inlet of the tenth compressor and cooling fluid; and a controller configured to control the first valve, the second valve, the third valve, the fourth valve, the first variable diffuser, the second variable diffuser, the third variable diffuser, and the fourth variable diffuser.

According to an aspect of another exemplary embodiment, there is provided a compressor system including: a first compressing device including a first compressor including a first variable diffuser, of which an area is variable depending on an external signal, and configured to compress boil-off gas, a second compressor including a second variable diffuser, of which an area is variable depending on an external signal, and configured to compress fluid discharged by the first compressor, a third compressor, a fourth compressor, and a fifth compressor which are sequentially disposed in series in this stated order in a downstream of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and cooling fluid, and a second intercooler located between an outlet of the fourth compressor and an inlet of the fifth compressor and cooling fluid; a second compressing device including: a sixth compressor including a third variable diffuser, of which an area is variable depending on an external signal, and configured to compress boil-off gas, a seventh compressor including a fourth variable diffuser, of which an area is variable depending on an external signal, and configured to compress fluid discharged by the sixth compressor, an eighth compressor, a ninth compressor, and a tenth compressor which are sequentially disposed in series in this stated order in a downstream of the seventh compressor, a third valve configured to open or close a third channel connecting an outlet of the seventh compressor to an inlet of the eighth compressor, and a fourth valve configured to open or close a fourth channel connecting the outlet of the seventh compressor to the inlet of the eighth compressor, and a controller configured to control the first valve, the second valve, the third valve, the fourth valve, the first variable diffuser, the second variable diffuser, the third variable diffuser, and the fourth variable diffuser, wherein one selected from the first intercooler and the second intercooler is connected to the fourth channel and cools fluid, and the other one is connected between an outlet of the ninth compressor and an inlet of the tenth compressor and cools fluid.

According to an aspect of another exemplary embodiment, there is provided a compressor system including: a first compressing device including a first compressor including a first variable diffuser, of which an area is variable depending on an external signal, and configured to compress boil-off gas, a second compressor including a second variable diffuser, of which an area is variable depending on an external signal, and configured to compress fluid discharged by the first compressor, a third compressor, a fourth compressor, and a fifth compressor which are sequentially disposed in series in this stated order in a downstream of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and cooling fluid, and a second intercooler provided between an outlet of the fourth compressor and an inlet of the fifth compressor and cooling fluid; a second compressing device including a sixth compressor through a ninth compressor connected in series, thereby having a four-stage compression operation, and configured to be parallel to the first compressing device; and a controller configured to control the first valve, the second valve, the first variable diffuser, and the second variable diffuser, and to optionally control the first compressing device and the second compressing device according to a temperature range of the boil-off gas.

According to an aspect of another exemplary embodiment, there is provided a compressor system including: a first compressor including a first variable diffuser having a diffuser area which varies in size based on an external signal, and configured to compress boil-off gas; a second compressor including a second variable diffuser having a diffuser area which varies in size based on an external signal and configured to compress fluid discharged by the first compressor; a third compressor configured to compress fluid discharged by the second compressor; a fourth compressor configured to compress fluid discharged by the third compressor; a fifth compressor configured to compress fluid discharged by the fourth compressor; a first channel configured to connect an outlet of the second compressor to an inlet of the third compressor; a first valve provided to the first channel and configured to open or close the first channel based on an external signal; a second channel configured to connect the outlet of the second compressor to the inlet of the third compressor; a second valve provided to the second channel and configured to open or close the second channel based on an external signal; a first intercooler provided to the second channel and configured to cool fluid passing through the second channel; a second intercooler provided between an outlet of the fourth compressor and an inlet of the fifth compressor and configured to cool the fluid discharged by the fourth compressor; and a controller configured to control the first valve, the second valve, the first variable diffuser, and the second variable diffuser.

According to an aspect of another exemplary embodiment, there is provided a compressor system including: a first compressing device including: a first compressor including a first variable diffuser, of which a metering area is varied based on an external signal, and configured to compress boil-off gas, a second compressor including a second variable diffuser, of which a metering area is varied based on an external signal, and configured to compress fluid discharged by the first compressor, a third compressor, a fourth compressor, and a fifth compressor which are sequentially disposed in series at a downstream side of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and configured to cool fluid passing through the second compressor, and a second intercooler provided between an outlet of the fourth compressor and an inlet of the fifth compressor and configured to cool fluid passing through the fourth compressor; a second compressing device including: a sixth compressor including a third variable diffuser, of which a metering area is varied based on an external signal, and configured to compress boil-off gas, a seventh compressor including a fourth variable diffuser, of which a metering area is varied based on an external signal, and configured to compress fluid discharged by the sixth compressor, an eighth compressor, a ninth compressor, and a tenth compressor which are sequentially disposed in series at a downstream side of the seventh compressor, a third valve configured to open or close a third channel connecting an outlet of the seventh compressor to an inlet of the eighth compressor, a fourth valve configured to open or close a fourth channel connecting the outlet of the seventh compressor to the inlet of the eighth compressor, a third intercooler provided to the fourth channel and configured to cool fluid passing through the seventh compressor, and a fourth intercooler provided between an outlet of the ninth compressor and an inlet of the tenth compressor and configured to cool fluid passing through the ninth compressor; and a controller configured to control the first valve, the second valve, the third valve, the fourth valve, the first variable diffuser, the second variable diffuser, the third variable diffuser, and the fourth variable diffuser.

According to an aspect of another exemplary embodiment, there is provided a compressor system including: a first compressing device including: a first compressor including a first variable diffuser, of which a metering area is varied based on an external signal, and configured to compress boil-off gas, a second compressor including a second variable diffuser, of which a metering area is varied based on an external signal, and configured to compress fluid discharged by the first compressor, a third compressor, a fourth compressor, and a fifth compressor which are sequentially disposed in series at a downstream side of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and configured to cool fluid passing through the second compressor, and a second intercooler located between an outlet of the fourth compressor and an inlet of the fifth compressor and configured to cool fluid passing through the fourth compressor; a second compressing device including: a sixth compressor including a third variable diffuser, of which a metering area is varied based on an external signal, and configured to compress boil-off gas, a seventh compressor including a fourth variable diffuser, of which a metering area is varied based on an external signal, and configured to compress fluid discharged by the sixth compressor, an eighth compressor, a ninth compressor, and a tenth compressor which are sequentially disposed in series at a downstream side of the seventh compressor, a third valve configured to open or close a third channel connecting an outlet of the seventh compressor to an inlet of the eighth compressor, and a fourth valve configured to open or close a fourth channel connecting the outlet of the seventh compressor to the inlet of the eighth compressor, and a controller configured to control the first valve, the second valve, the third valve, the fourth valve, the first variable diffuser, the second variable diffuser, the third variable diffuser, and the fourth variable diffuser, wherein one selected from the first intercooler and the second intercooler is connected to the fourth channel and configured to cool fluid passing through the seventh compressor, and the other one is connected between an outlet of the ninth compressor and an inlet of the tenth compressor and configured to cool fluid passing through the ninth compressor.

According to an aspect of another exemplary embodiment, there is provided a compressor system including: a first compressing device including: a first compressor including a first variable diffuser, of which a metering area is varied based on an external signal, and configured to compress boil-off gas, a second compressor including a second variable diffuser, of which a metering area is varied based on an external signal, and configured to compress fluid discharged by the first compressor, a third compressor, a fourth compressor, and a fifth compressor which are sequentially disposed in series at a downstream side of the second compressor, a first valve configured to open or close a first channel connecting an outlet of the second compressor to an inlet of the third compressor based on an external signal, a second valve configured to open or close a second channel connecting the outlet of the second compressor to the inlet of the third compressor based on an external signal, a first intercooler provided to the second channel and configured to cool fluid passing through the second compressor, and a second intercooler provided between an outlet of the fourth compressor and an inlet of the fifth compressor and configured to cool fluid passing through the fourth compressor; a second compressing device including a sixth compressor, a seventh compressor, an eighth compressor and a ninth compressor connected in series, thereby configured to perform a four-stage compression operation, and configured to be parallel to the first compressing device; and a controller configured to control the first valve, the second valve, the first variable diffuser, and the second variable diffuser, and to control the first compressing device and the second compressing device according to a temperature range of the boil-off gas.

DETAILED DESCRIPTION

Figure 1:
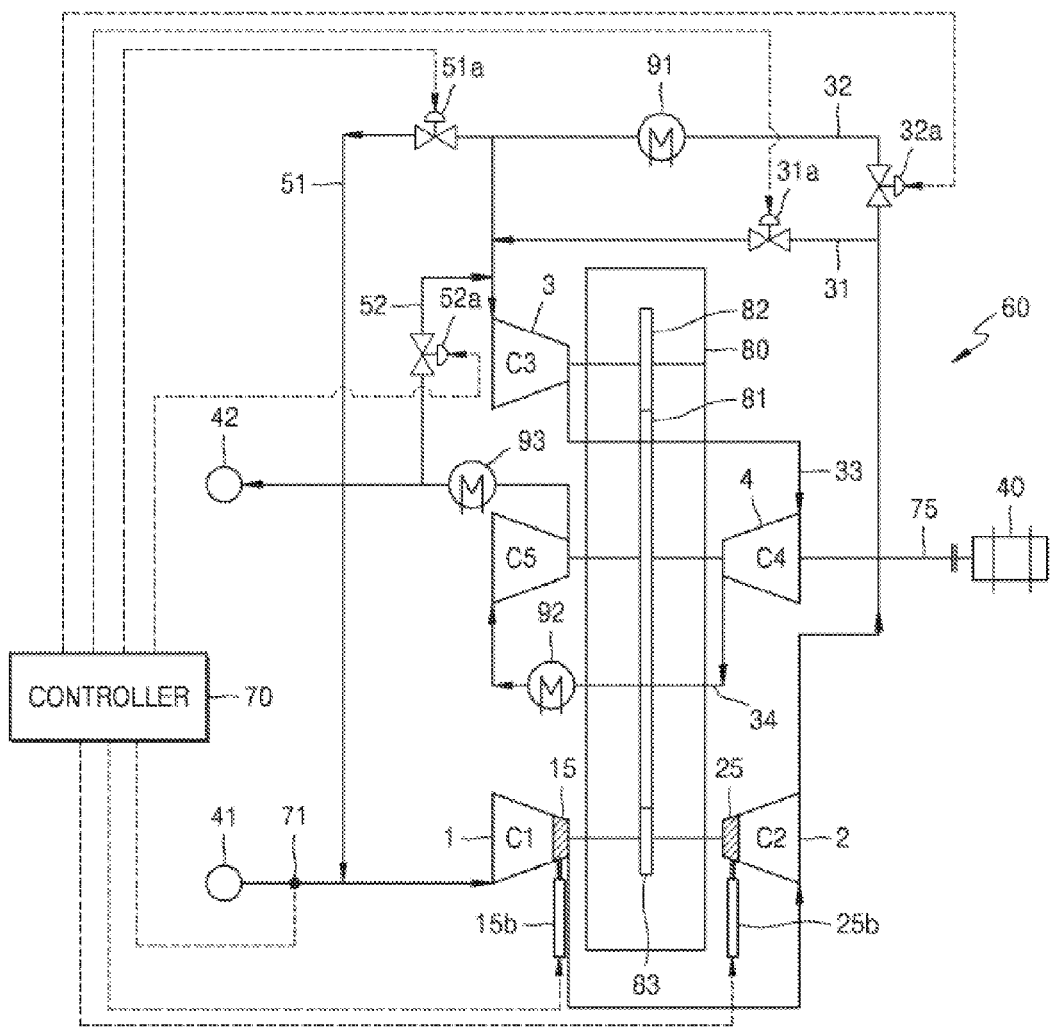
FIG. 1 shows a circuit diagram illustrating a connection relationship of compressors included in a coupling structure of components of a compressor system according to an exemplary embodiment.
Figure 2:
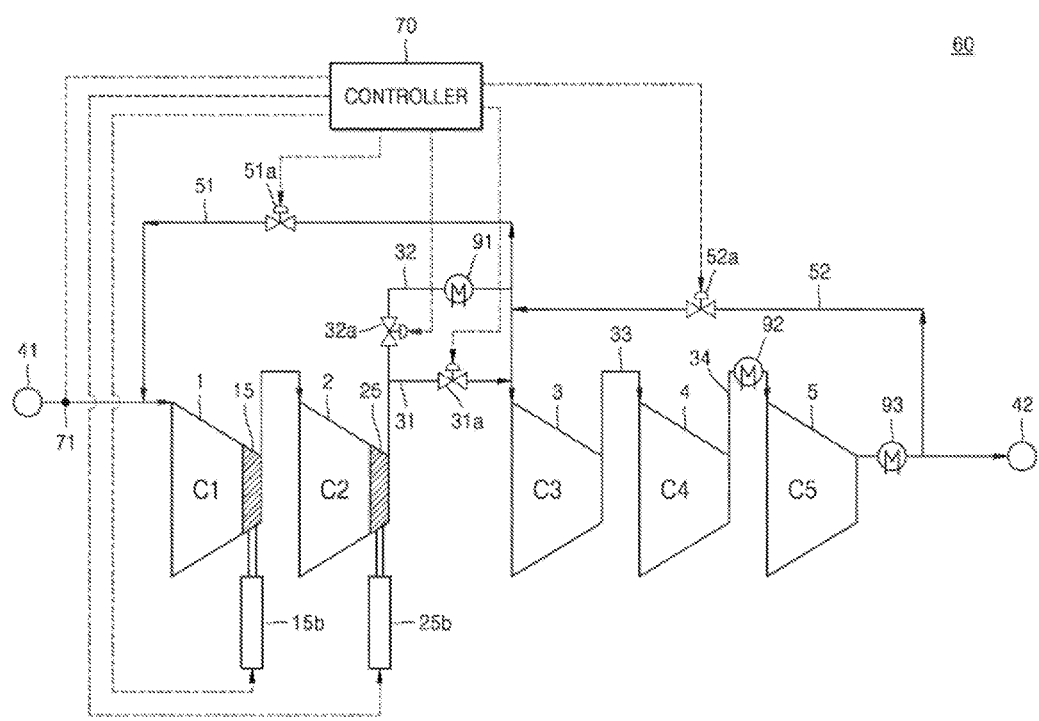
FIG. 2 shows a circuit diagram illustrating the compressor system of FIG. 1 with respect to the flow of fluid.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items FIG. 1 shows a circuit diagram illustrating a connection relationship of compressors included in the a coupling structure of a compressor system 60 according to an exemplary embodiment, and FIG. 2 shows a circuit diagram illustrating the compressor system 60 of FIG. 1 with respect to the flow of fluid;

The compressor system 60 according to the exemplary embodiment illustrated in FIGS. 1 and 2 is designed as a five (5)-stage compressor including a total of five compressor stages C1, C2, C3, C4 and C5, and includes a first compressor 1, a second compressor 2, a third compressor 3, a fourth compressor 4, and a fifth compressor 5 in each stage which are connected to each other in series with respect to the flow of fluid treated by the compressor system 60.

The compressor system 60 is provided to a liquefied natural gas (LNG) carrier, and compresses boil-off gas (BOG) vaporized in a LNG storage tank and provides the compressed gas to an engine as fuel. With respect to the flow of fluid (i.e., BOG), the first compressor 1 through the fifth compressor 5 are connected in series. However, to minimize an installation area and optimize the flow of fluid, the first compressor 1 through the fifth compressor 5 may be configured in a three-dimensional structure. As shown in FIG. 1, the second compressor 2 may be located symmetric to the first compressor 1 along an extension to an axis of the first compressor 1.

Referring to FIG. 1, the first compressor 1 and the second compressor 2 include a first variable diffuser 15 and a second variable diffuser 25, respectively. The first variable diffuser 15 and the second variable diffuser 25 operate in response to external signals to change diffuser areas of the first compressor 1 and the second compressor 2, respectively.

The first variable diffuser 15 and the second variable diffuser 25 are driven by a first driver 15b and a second driver 25b, respectively. The first driver 15b and the second driver 25b operate in response to control signals applied by a controller 70 to drive the first variable diffuser 15 and the second variable diffuser 25, respectively. Each of the first variable diffuser 15 and the second variable diffuser 25 may be embodied as a variable geometry diffuser (VGD), which controls an opening degree of a channel of a compressor turbine, to control a bypass flow rate.

The first compressor 1 receives, from a collector 41, BOG that has been generated in a LNG storage tank and collected by the collector 41, compresses the BOG, and discharges the compressed BOG to the second compressor 2. The second compressor 2 compresses fluid that has been discharged by the first compressor 1, and then, discharges the compressed fluid to the third compressor 3. The fourth compressor 4 compresses fluid discharged by the third compressor 3 and then, discharges the compressed fluid to the fifth compressor 5.

Referring to FIG. 1, the first compressor 1 through fifth compressor 5 are mechanically connected to a gear box 80 (e.g., a common gear box), and due to a driving force of a motor 40, delivered to the gear box 80, the first compressor 1 through the fifth compressor 5 may rotate.

The fourth compressor 4 and the fifth compressor 5 are connected to a driving axis 75 that is rotated by the motor 40, and accordingly, when the driving axis 75 rotates, the fourth compressor 4 and the fifth compressor 5 rotate. A driving gear 81 is disposed on the driving axis 75. When the driving axis 75 rotates, the driving gear 81 rotates together with the driving axis 75, and the rotational force of the driving axis 75 is delivered to a first driven gear 82 and a second driven gear 83, which are engaged with the driving gear 81. As a result, the third compressor 3 connected to the first driven gear 82, and the first compressor 1 and the second compressor 2, which are connected to the second driven gear 83, rotate based on the rotation of the driving gear 81.

Referring to FIGS. 1 and 2, an outlet of the second compressor 2 is connected to an inlet of the third compressor 3 via a first channel 31. A first valve 31a is provided to the first channel 31. The first valve 31a opens or closes the first channel 31 in response to external signals.

The first valve 31a may be embodied as a hydraulic actuated valve or a pneumatic actuated valve, which actuates in response to hydraulic or pneumatic signals. For example, the first valve 31a may also be embodied as a solenoid valve that actuates in response to electromagnetic signals. Accordingly, when the controller 70 applies a signal to the first valve 31a, the first valve 31a performs an 'open' operation to open the first channel 31 or a 'close' operation to close the first channel 31, thereby allowing fluid passing through the first channel 31 to flow therethrough or blocking the flow of the fluid through the first channel 31. Hereinafter, 'open' a valve means an open operation of a valve that is performed to open a channel, and 'close' a valve means a close operation of a valve that is performed to close a channel.

A second channel 32 is arranged parallel to the first channel 31 and provided between the outlet of the second compressor 2 and the inlet of the third compressor 3. A second valve 32a is provided to the second channel 32. The second valve 32a opens or closes the second channel 32 in response to external signals. Like the first valve 31a, the second valve 32a opens or closes the second channel 32 in response to signals applied by the controller 70, thereby allowing fluid to pass through the second channel 32 or blocking the flow of the fluid through the second channel 32.

A first intercooler 91 is provided to the second channel 32 to cool fluid passing through the second channel 32. For example, the first intercooler 91 may be embodied as a liquid-cooling heat exchanger in which a cooling pipe, through which a refrigerant flows, is configured to surround the second channel 32 to cause a heat exchange between the cooling pipe and the second channel 32, or an air-cooling device using a cooling fan.

The first channel 31 and the second channel 32 connect the second compressor 2 to the third compressor 3 in such a way that the first channel 31 and the second channel 32 are aligned in parallel to each other, and due to the operation of the first valve 31a and the second valve 32a, the first channel 31 and the second channel 32 may be optionally open. That is, when the first channel 31 is open and the second channel 32 is closed, fluid discharged by the second compressor 2 may directly flow to the third compressor 3. When the first channel 31 is closed and the second channel 32 is open, fluid discharged by second compressor 2 is cooled by the first intercooler 91 and delivered to the third compressor 3.

An outlet of the third compressor 3 is connected to an inlet of the fourth compressor 4 via a middle channel 33, so that fluid compressed and discharged by the third compressor 3 flows to the fourth compressor 4.

A second intercooler 92 may be provided to a middle channel 34 connecting an outlet of the fourth compressor 4 to an inlet of the fifth compressor 5. The second intercooler 92 performs the same operation as the first intercooler 91. That is, the second intercooler 92 cools fluid discharged by the fourth compressor 4 and allows the cooled fluid to flow to the fifth compressor 5.

The first intercooler 91 and the second intercooler 92 cool fluidic gas flowing into the third compressor 3 and the fifth compressor 5 to increase a working flow rate range of the third compressor 3 and the fifth compressor 5, respectively, leading to a decrease in driving power.

An outlet of the fifth compressor 5 may be connected to an after-cooler 93. The after-cooler 93 compresses fluid discharged by the fifth compressor 5, and then, sends the fluid to a fuel supplier 42 that supplies fuel to an engine.

Referring to FIG. 1, the first intercooler 91, the second intercooler 92, and the after-cooler 93 are provided on a skid on which the first compressor 1, the second compressor 2, the third compressor 3, the fourth compressor 4, and the fifth compressor 5 are disposed. However, it may be understood that the exemplary embodiments are not limited thereto. For example, the first intercooler 91, the second intercooler 92, and the after-cooler 93 may be provided outside the skid on which the first compressor 1, the second compressor 2, the third compressor 3, the fourth compressor 4, and the fifth compressor 5 are disposed.

Referring back to FIGS. 1 and 2, the compressor system 60 may include a first surge channel 51 connecting the inlet of the third compressor 3 to an outlet of the first compressor 1, and a first surge valve 51a that is provided to the first surge channel 51 to open or close the first surge channel 51.

In addition, the compressor system 60 may include a second surge channel 52 connecting the outlet of the fifth compressor 5 to the inlet of the third compressor 3, and a second surge valve 52a that is provided to the second surge channel 52 to open or close the second surge channel 52. The second surge channel 52 connects a point where fluid discharged from the outlet of the fifth compressor 5 has already passed through the after-cooler 93 to the inlet of the third compressor 3.

The first surge valve 51a and the second surge valve 52a may each be embodied as an anti-surge valve (ASV) to prevent a surge that may occur in the compressor system 60.

A surge phenomenon refers to a periodic reverse flow of a current that occurs inside a compressor when the compressor fails to produce pressure that is greater than the pressure of a fluid control system.

Once a surge occurs, the current periodically, reversely flows, and thus, pressure and a flow rate are perturbed, which causes mechanical vibrations and damages components, such as a bearing or an impeller.

The surge may deteriorate the performance of a compressor and reduces a lifespan thereof. Accordingly, in driving a compressor, an anti-surge function is considered as an important feature in a compressor control system.

However, when the first surge valve 51a and the second surge valve 52a are embodied as an ASV, the occurrence of the surge may be prevented by reducing a resistance of the compressor system 60.

The second surge channel 52 connected to the downstream of the outlet of the fifth compressor 5 and the second surge valve 52a may prevent the occurrence of a surge in the third compressor 3, the fourth compressor 4, and the fifth compressor 5 respectively corresponding to the third stage to fifth stage C3 to C5.

The first surge valve 51a may be used in an initial cooling operation using nitrogen ($N_2$), or under a natural gas (NG) free flow condition during when a compressor stops.

The first valve 31a provided to the first channel 31 connected to the inlet of the third compressor 3 operates when the temperature of BOG is 315.15 K (42 degrees Celsius or higher), to prevent the occurrence of a surge.

The compressor system 60 may include a sensor 71 that detects the temperature of BOG supplied to the first compressor 1. The sensor 71 is electrically connected to the controller 70, and accordingly, an electric signal associated to the detected temperature of BOG is provided to the controller 70. By doing so, the controller 70 may control an operation of compressors of the compressor system 60 based on the change in the temperature of BOG.

The controller 70 is electrically connected to and controls the first valve 31a, the second valve 32a, the first surge valve 51a, the second surge valve 52a, the first driver 15b for driving the first variable diffuser 15, and the second driver 25b for driving the second variable diffuser 25. The controller 70 is electrically connected to the sensor 71 and receives an electric signal from the sensor 71.

In the related art, when little LNG is present in a storage tank, that is, under a heel out condition, the operation of a compressor is impossible. Accordingly, BOG is not used, and in many cases, unused BOG is combusted in a gas combustion unit.

When the compressor system 60 needs to be driven under a heel out condition in which LNG is absent in a storage tank, or under a maximum heel out condition in which only minimum fuel for sailing remains, the controller 70 may control an operational state of the first compressor 1 through fifth compressor 5 by controlling the first valve 31a, the second valve 32a, the first surge valve 51a, the second surge valve 52a, the first driver 15b, and the second driver 25b.

The controller 70 may control the compressor system 60 based on the conditions shown in Table 1.

TABLE 1

| Operation conditions | | | | Flow recirculation | Examples of valve operational state | | | |
|---|---|---|---|---|---|---|---|---|
| | Temperature (Celsius) | Pressure (barA) | DGV #1, #2 % | Based on % mass flow rate | first valve | second valve | first surge valve | second surge valve |
| laden | −140 to −90 | 1.03 | 100/80/70/50/30 | 0/0/20/50/80 | Open | close | close | close: up to 70% open: up to 30% |
| ballast | +35 | 1.03 | 100/80/70/50/30 | 0/0/30/60/80 | Open | close | close | close: up to 70% open: up to 30% |
| Minimum flow rate | −84 to +35 | 1.03 | 100/80/70/50/30 | 0/0/30/50/80 | Close | open | close | close: up to 80% open: up to 20% |

In Table 1, DGV #1 indicates an opening degree of a channel caused by the first variable diffuser 15, and DGV #2 indicates an opening degree of a channel caused by the second variable diffuser 25.

The controller 70 may be embodied as, for example, a semiconductor chip, a control board manufactured in the form of a printed circuit board including a semiconductor chip and circuits, software to be included in a semiconductor chip or a control board, or a control algorithm included in a computer provided to a semiconductor chip mounting apparatus.

In the 1970s to the 1990s, a steam turbine and a diesel engine were provided to an LNG carrier, and as of the year 2000, a duel fuel diesel electric (DFDE) engine has been used in an LNG carrier.

In the related art, for the supply of fuel to the DFDE engine, a 3-stage or 4-stage low pressure (LD) compressor is used to provide compressed fuel having a gauge pressure of 6.5 barA. However, an engine for a recent LNG carrier requires fuel gas having pressure as high as 16 barA, and at a higher pressure than that, when a 1-stage compressor is used, up to a gage pressure of 25 barA may be obtained, and thus, a low pressure LD compressor of the related art may not be suitable for supplying fuel gas to an engine.

However, according to the compressor system 60 according to the exemplary embodiment, the first compressor 1 through the fifth compressor 5, constituting a total of five (5) stages C1, C2, C3, C4 and C5, are used to compress fluid into a high-pressure fluid. Accordingly, a high fuel supply requirement of an engine that is driven by high pressure of fuel gas may be satisfied.

In the exemplary embodiment described above, the compressor system 60 has five stages. However, it may be understood that the exemplary embodiments are not limited thereto. Accordingly, for example, when a pressure of 16 barA or more is required according to construction conditions, a sixth compressor may be additionally connected to a rear end of the fifth compressor 5, thereby providing a compressor system having a total of six stages.

The first compressor 1 corresponding to the first stage C1 and the second compressor 2 corresponding to the second stage C2 respectively include the first variable diffuser 15 and the second variable diffuser 25, respectively. Accordingly, in the case of partial loads, that is, when loads are below a maximum load of the compressor system 60, during the operation of the compressor system 60, a flow rate range in which the first compressor 1 and the second compressor 2 operate may be controlled (i.e., a metering area of the first and second variable diffusers is controlled), thereby minimizing power loss.

Also, the occurrence of a surge may also be prevented by manipulating the first variable diffuser 15 and the second variable diffuser 25 of the first compressor 1 and the second compressor 2 to control a flow rate range in which the first compressor 1 and the second compressor 2 operate. By doing this, a need for a returning line including a recycling intercooler may be minimized, and without providing an inlet guide vane (IGV) to the inlets of the third compressor 3 through fifth compressor 5 to control an operating area of the third compressor 3 through fifth compressor 5 corresponding to the third stage C3 to fifth stage C5, the compressor system 60 may be constructed compact.

Figure 3:
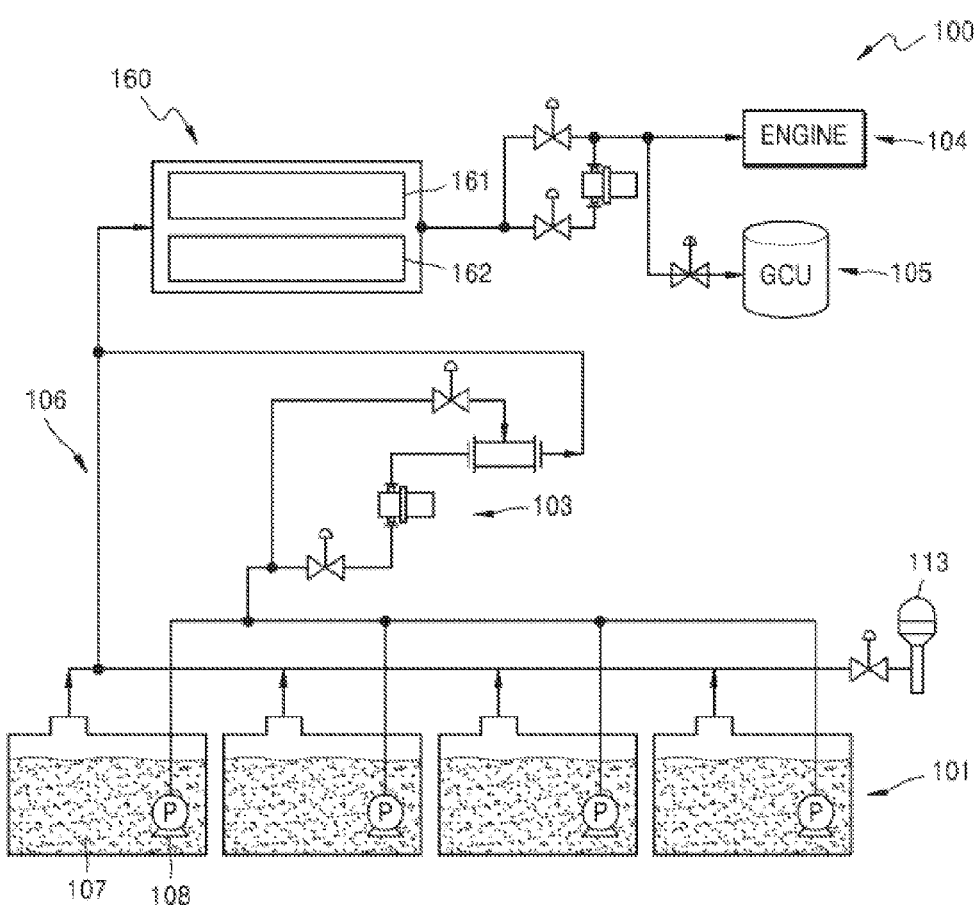
FIG. 3 shows a schematic explanation diagram illustrating a connection relationship of components included in a fuel supply system of a liquefied natural gas (LNG) carrier engine including a compressor system according to an exemplary embodiment.

FIG. 3 shows a schematic explanation diagram illustrating a connection relationship of components included in a fuel supply system 100 of an LNG carrier engine including a compressor system 160 according to an exemplary embodiment.

FIG. 3 is a view of the fuel supply system 100 including a compressor system 160 according to an exemplary embodiment. The fuel supply system 100 includes an LNG storage tank 101, a forced vaporizer 103, an engine 104, a gas combustion unit (GCU) 105, and a pipe 106.

The LNG storage tank 101 may store LNG 107 that has been cooled to −162° C. The LNG storage tank 101 may include a plurality of storage tanks. Although in the exemplary embodiment, the LNG storage tank 101 included in the fuel supply system 100 includes a plurality of independent storage tanks, the exemplary embodiment is not limited thereto and the LNG storage tank 101 may be a membrane-shaped storage tank.

A pump 108 is provided to the inside of the LNG storage tank 101 to discharge the LNG 107 to the outside of the LNG storage tank 101. A vent mask 113 is provided to the LNG storage tank 101 to suppress the occurrence of abnormal high-pressure.

BOG generated in the LNG storage tank 101 is supplied to the compressor system 160 through the pipe 106. The compressor system 160 compresses BOG and supplies the compressed BOG to the engine 104.

The compressor system 160 includes a first compressing device 161 and a second compressing device 162, which are located in parallel and operated in different temperature ranges. Each of the first compressing device 161 and the second compressing device 162 includes multiple-stage compressors, and is a multiple-stage compressing device that compresses BOG through a plurality of stages according to temperature and flow rate of the BOG.

When BOG vaporized from the LNG storage tank 101 is delivered to the compressor system 160, the BOG may be optionally delivered to any one of the first compressing device 161 and the second compressing device 162 inside the compressor system 160.

Because the compressor system 160 compresses BOG to a pressure and temperature which are suitable for the engine 104 and then supplies the compressed BOG to the engine 104, the BOG vaporized in the LNG storage tank 101 may be used as an energy source of the engine 104 to propel an LNG carrier.

The gas combustion unit 105 combusts excess BOG in the supply procedure of BOG to the engine 104.

The forced vaporizer 103 forcedly vaporizes LNG for the supply to the engine 104 when little BOG remains in the LNG storage tank 101.

The first compressing device 161 of the compressor system 160 may be operated in an extremely low temperature range, and the second compressing device 162 may be operated in a high temperature range including room temperature.

Figure 4:
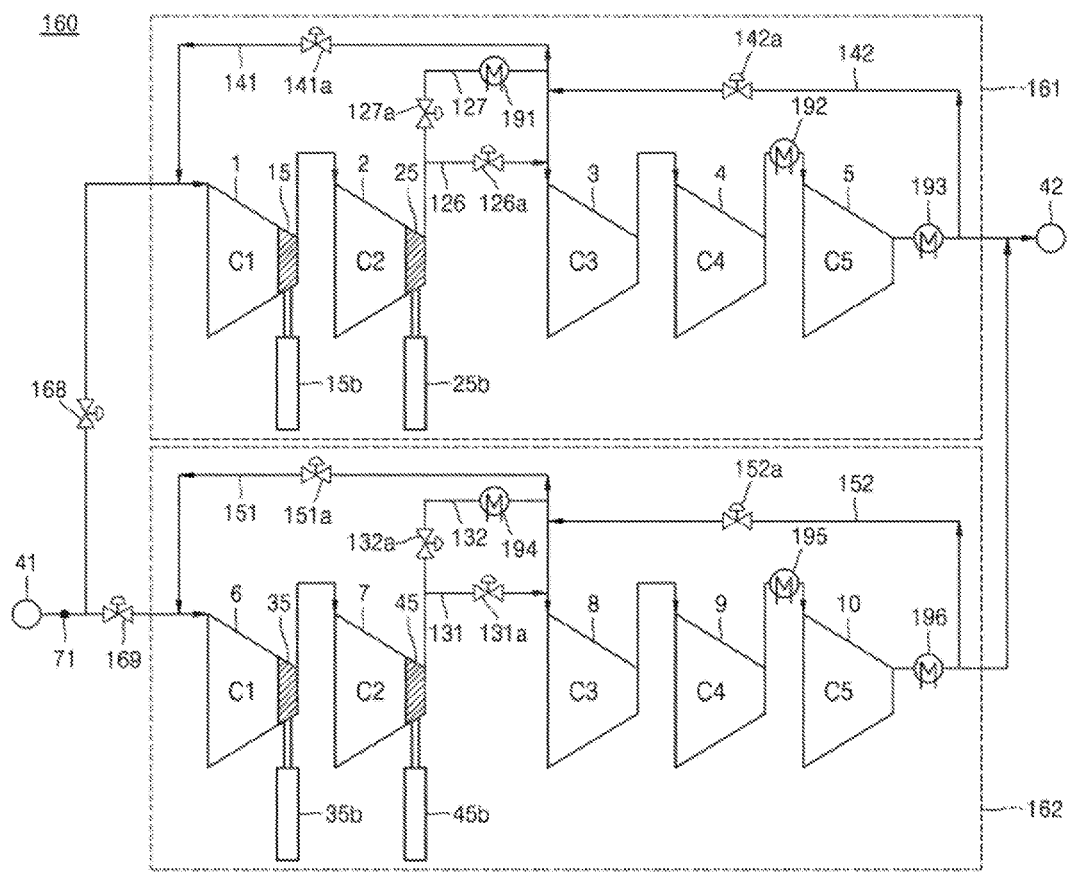
FIG. 4 shows a circuit diagram illustrating a connection relationship of components of the compressor system included in the fuel supply system of FIG. 3.

FIG. 4 shows a circuit diagram illustrating a connection relationship of components of the compressor system 160 included in the fuel supply system 100 of FIG. 3 according to an exemplary embodiment.

FIG. 4 shows a detailed view of the compressor system 160 of the fuel supply system 100 of FIG. 3. FIG. 4 does not show a controller. However, in the exemplary embodiment, the same controller as explained in connection with FIGS. 1 and 2 may be used to control valves and drivers of the compressor system 160.

The first compressing device 161 and the second compressing device 162 of the compressor system 160 illustrated in FIG. 4 are aligned in parallel to each other, and each of the first compressing device 161 and the second compressing device 162 is the same as illustrated in the exemplary embodiment explained in connection with FIG. 2.

The first compressing device 161 is engaged in a compression operation of each of the first stage C1 through the fifth stage C5, and includes the first compressor 1, the second compressor 2, the third compressor 3, the fourth compressor 4, and the fifth compressor 5 in each of the stages (C1-C5), which are connected in series with respect to the flow of fluid.

The second compressing device 162 is engaged in a compression operation of each of the first stage C1 through the fifth stage C5, and includes a sixth compressor 6, a seventh compressor 7, an eighth compressor 8, a ninth compressor 9, and a tenth compressor 10 in each of the stages (C1-C5), which are connected in series with respect to the flow of fluid.

The first compressor 1 and second compressor 2 of the first compressing device 161 and the sixth compressor 6 and seventh compressor 7 of the second compressing device 162 include a first variable diffuser 15, a second variable diffuser 25, the third variable diffuser 35, and the fourth variable diffuser 35, respectively. The first variable diffuser 15, the second variable diffuser 25, the third variable diffuser 35, and the fourth variable diffuser 35 are driven by drivers 15$b$, 25$b$, 35$b$, and 45$b$, respectively.

In the first compressing device 161, a first valve 126$a$ is provided to a first channel 126 connecting an outlet of the second compressor 2 to an inlet of the third compressor 3 to open or close the first channel 126. A second valve 127$a$ and a first intercooler 191 are provided to a second channel 127 connecting the outlet of the second compressor 2 to the inlet of the third compressor 3 in parallel to the first channel 126.

In the first compressing device 161, a second intercooler 192 is disposed between an outlet of the fourth compressor 4 and an inlet of the fifth compressor 5.

In the first compressing device 161, a first surge valve 141$a$ is provided to a first surge channel 141 connecting the inlet of the third compressor 3 to an inlet of the first compressor 1 to open or close the first surge channel 141. A second surge valve 142$a$ is provided to a second surge channel 142 connecting an outlet of the fifth compressor 5 to the inlet of the third compressor 3 to open or close the second surge channel 142.

In the second compressing device 162, a third valve 131$a$ is provided to a third channel 131 connecting an outlet of the seventh compressor 7 to an inlet of the eighth compressor 8 to open or close the third channel 131. A fourth valve 132$a$ and a third intercooler 194 are provided to a fourth channel 132 connecting the outlet of the seventh compressor 7 to the inlet of the eighth compressor 8 in parallel to the third channel 131.

In the second compressing device 162, a fourth intercooler 195 is disposed between an outlet of the ninth compressor 9 to an inlet of the tenth compressor 10.

In the second compressing device 162, a third surge valve 151$a$ is provided to a third surge channel 151 connecting the inlet of the eighth compressor 8 to an inlet of the sixth compressor 6 to open or close the third surge valve 151$a$. A fourth surge valve 152$a$ is provided to a fourth surge channel 152 connecting an outlet of the tenth compressor 10 to the inlet of the eighth compressor 8 to open or close the fourth surge channel 152.

A first after-cooler 193 and a second after-cooler 196 may be provided to the outlet of the fifth compressor 5 of the first compressing device 161 and the outlet of the tenth compressor 10 of the second compressing device 162, respectively. The first after-cooler 193 and the second after-cooler 196 cool BOG discharged by the fifth compressor 5 and the tenth compressor 10, respectively, to a temperature that is suitable for use in an engine. The BOG cooled and discharged by the first after-cooler 193 and the second after-cooler 196 is delivered to a fuel supplier 42 that supplies fuel to an engine.

When a first selection valve 168 is opened, a collector 41 that has collected BOG generated in an LNG storage tank supplies BOG to the first compressing device 161, and in this regard, a second selection valve 169 remains closed. On the other hand, when the second selection valve 169 is opened, the collector 41 supplies BOG to the second compressing device 162, and in this regard, the first selection valve 168 remains closed.

Accordingly, a controller (not shown) may optionally drive the first compressing device 161 and the second compressing device 162 by controlling actuation of the first selection valve 168 and the second selection valve 169 based on the temperature of BOG detected by the sensor 71.

The first compressing device 161 is used during a laden voyage. The first compressing device 161 may be utilized when the inlet of the first compressor 1 has an extremely low temperature range of −140 degrees Celsius to −90 degrees Celsius.

The second compressing device 162 is used during a ballast voyage. The second compressing device 162 may be utilized when the inlet of the sixth compressor 6 has a temperature range of −84 degrees Celsius to +35 degrees Celsius, including room temperature.

As described above, the first compressing device 161 is operated only in the extremely low temperature range, and when the first compressing device 161 breaks down, the second compressing device 162 may be operated instead of the first compressing device 161.

In the compressor system 160, the configuration of the first compressing device 161 may be identical to the configuration of the second compressing device 162. Accordingly, the first compressing device 161 is completely compatible with the second compressing device 162. Because components of the first compressing device 161 may be identical to components of the second compressing device 162, compatibility of components during maintenance may be optimized.

Figure 5:
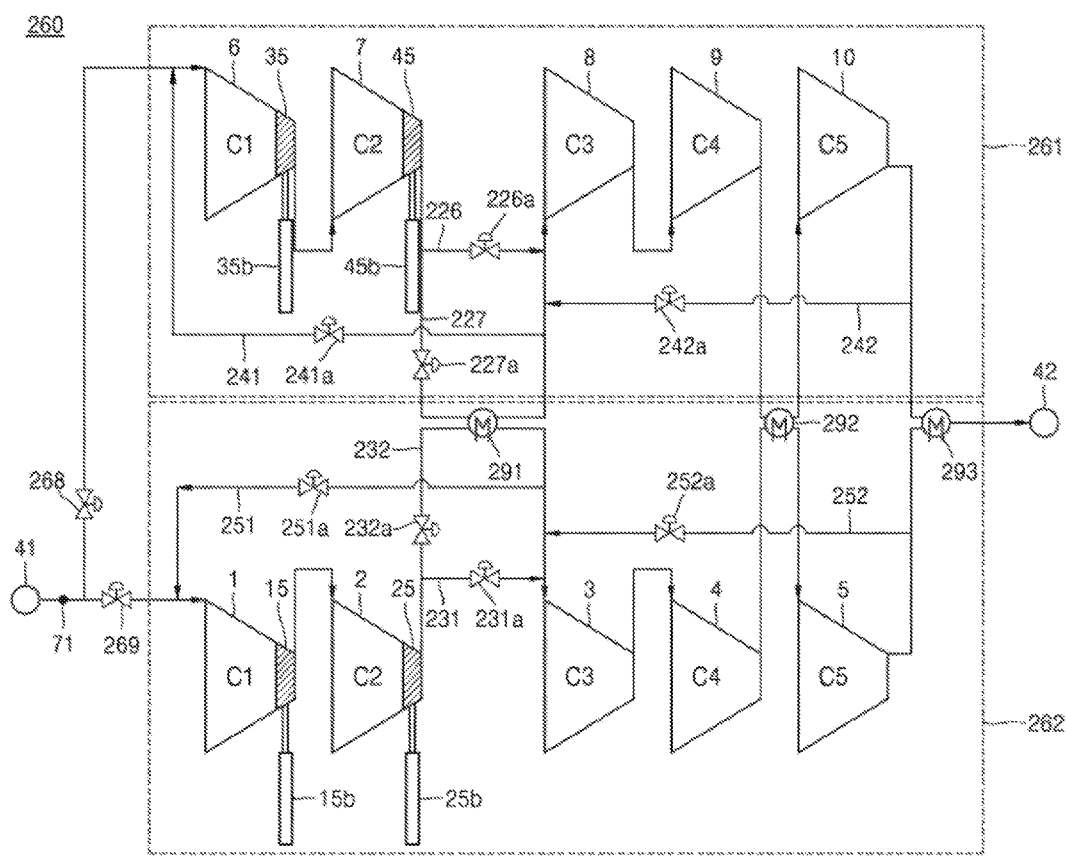
FIG. 5 shows a circuit diagram illustrating a connection relationship of components included in another example of a compressor system that is applicable to the fuel supply system of FIG. 2 and different from the compressor system illustrated in FIG. 4.

FIG. 5 shows a circuit diagram illustrating a connection relationship of components included in a compressor system 260 that may be included in the fuel supply system 100 of FIG. 3 and is different from the compressor system 160 illustrated in FIG. 4. FIG. 5 does not show a controller. However, in the exemplary embodiment, the same controller as explained in connection with FIGS. 1 and 2 may be used to control valves and drivers of the compressor system 260.

The compressor system 260 of FIG. 5 includes a first compressing device 262 and a second compressing device 261. The configuration of the first compressing device 262 is the same as the configuration of a compressor system according to the exemplary embodiment illustrated in FIG. 2. Although the configuration of the second compressing device 261 is similar to that of the compressor system 60 according to the exemplary embodiment illustrated in FIG. 2, the second compressing device 261 is modified such that the second compressing device 261 and the first compressing device 262 share the first intercooler 291, the second intercooler 292, and the after-cooler 293.

The first compressing device 262 is engaged in a compression operation of each of the first stage C1 through the fifth stage C5, and includes the first compressor 1, the second compressor 2, the third compressor 3, the fourth compressor 4, and the fifth compressor 5, which are connected in series with respect to the flow of fluid.

The second compressing device 261 is engaged in a compression operation of each of the first stage C1 through the fifth stage C5, and includes the sixth compressor 6, the seventh compressor 7, the eighth compressor 8, the ninth compressor 9, and the tenth compressor 10, which are connected in series with respect to the flow of fluid.

The first compressor 1 and second compressor 2 of the first compressing device 262 and the sixth compressor 6 and seventh compressor 7 of the second compressing device 261 include a first variable diffuser 15, a second variable diffuser 25, the third variable diffuser 35, and the fourth variable diffuser 35, respectively. The first variable diffuser 15, the second variable diffuser 25, the third variable diffuser 35, and the fourth variable diffuser 35 are driven by drivers 15*b*, 25*b*, 35*b*, and 45*b*, respectively.

In the first compressing device 262, a first valve 231*a* is provided to a first channel 231 connecting an outlet of the second compressor 2 to an inlet of the third compressor 3 to open or close the first channel 231. A second valve 232*a* and a first intercooler 291 are provided to a second channel 232 connecting the outlet of the second compressor 2 to the inlet of the third compressor 3 in parallel to the first channel 231.

In the first compressing device 262, a second intercooler 292 is disposed between an outlet of the fourth compressor 4 and an inlet of the fifth compressor 5.

In the first compressing device 262, a first surge valve 251*a* is provided to a first surge channel 251 connecting the inlet of the third compressor 3 to an inlet of the first compressor 1 to open or close the first surge channel 251. A second surge valve 252*a* is provided to a second surge channel 252 connecting an outlet of the fifth compressor 5 to the inlet of the third compressor 3 to open or close the second surge channel 252.

In the second compressing device 261, a third valve 226*a* is provided to a third channel 226 connecting an outlet of the seventh compressor 7 to the inlet of the eighth compressor 8 to open or close the third channel 226. A fourth valve 227*a* is provided to a fourth channel 227 connecting the outlet of the seventh compressor 7 to the inlet of the eighth compressor 8 in parallel to the third channel 226 to open or close the fourth channel 227. The first intercooler 291 of the first compressing device 262 is connected to the fourth channel 227. Accordingly, the second compressing device 261 shares the first intercooler 291 with the first compressing device 262

The second intercooler 292 of the first compressing device 262 is connected between an outlet of the ninth compressor 9 and an inlet of the tenth compressor 10 of the second compressing device 261. The second compressing device 261 and the first compressing device 262 share the second intercooler 292.

In the second compressing device 261, a third surge valve 241*a* is provided to a third surge channel 241 connecting the inlet of the eighth compressor 8 to an inlet of the sixth compressor 6 to open or close the third surge valve 241*a*. A second surge valve 242*a* is provided to a fourth surge channel 242 connecting an outlet of the tenth compressor 10 to the inlet of the eighth compressor 8 to open or close the fourth surge channel 242.

An after-cooler 293 may be disposed at the sides of the outlet of the fifth compressor 5 of the first compressing device 262 and the outlet of the tenth compressor 10 of the second compressing device 261. The after-cooler 293 cools BOG discharged by the fifth compressor 5 and the tenth compressor 10 to a temperature that is suitable for use in an engine. The BOG cooled and discharged by first after-cooler 293 is delivered to a fuel supplier 42 that supplies fuel to an engine. As described above, the first compressing device 262 and the second compressing device 261 may share the after-cooler 293.

When a first selection valve 268 is open, a collector 41 that has collected BOG generated in an LNG storage tank supplies BOG to the first compressing device 262, and in this regard, a second selection valve 269 remains closed. On the other hand, when the second selection valve 269 is open, the collector 41 supplies BOG to the second compressing device 261, and in this regard, the first selection valve 268 remains closed.

Accordingly, a controller (not shown) may optionally drive the first compressing device 262 and the second compressing device 261 by controlling actuation of the first selection valve 268 and the second selection valve 269 based on the temperature of BOG detected by the sensor 71.

The first compressing device 262 is used during a laden voyage. The first compressing device 262 may be utilized when the inlet of the first compressor 1 has an extremely low temperature range of −140 degrees Celsius to −90 degrees Celsius.

The second compressing device 261 is used during a ballast voyage. The second compressing device 261 may be utilized when the inlet of the sixth compressor 6 has a low temperature range of −84 degrees Celsius to +35 degrees Celsius including room temperature.

As described above, the first compressing device 262 is operated only in the extremely low temperature range, and when the first compressing device 262 breaks down, the second compressing device 261 may be operated instead of the first compressing device 262.

In the compressor system 260, the first compressing device 262 and the second compressing device 261 may share the first intercooler 291, the second intercooler 292, and the after-cooler 293. That is, when the first compressing device 262 is operated, the first intercooler 291, the second intercooler 292, and the after-cooler 293 may be operated for the first compressing device 262, and when the second compressing device 261 is operated, the first intercooler 291, the second intercooler 292, and the after-cooler 293 may be operated for the second compressing device 261.

The use of the compressor system 260 may contribute to a smaller space for installation of an intercooler and an after-cooler. Accordingly, capital expenditure (CAPEX) may be reduced.

In the exemplary embodiment described above, the first compressing device 262 and the second compressing device 261 share an intercooler and an after-cooler. However, it may be understood that exemplary embodiments are not limited thereto. For example, the first compressing device 262 and the second compressing device 261 may share, in addition to a cooler, components associated with a lubrication system, such as an oil tank or an oil cooler.

Figure 6:
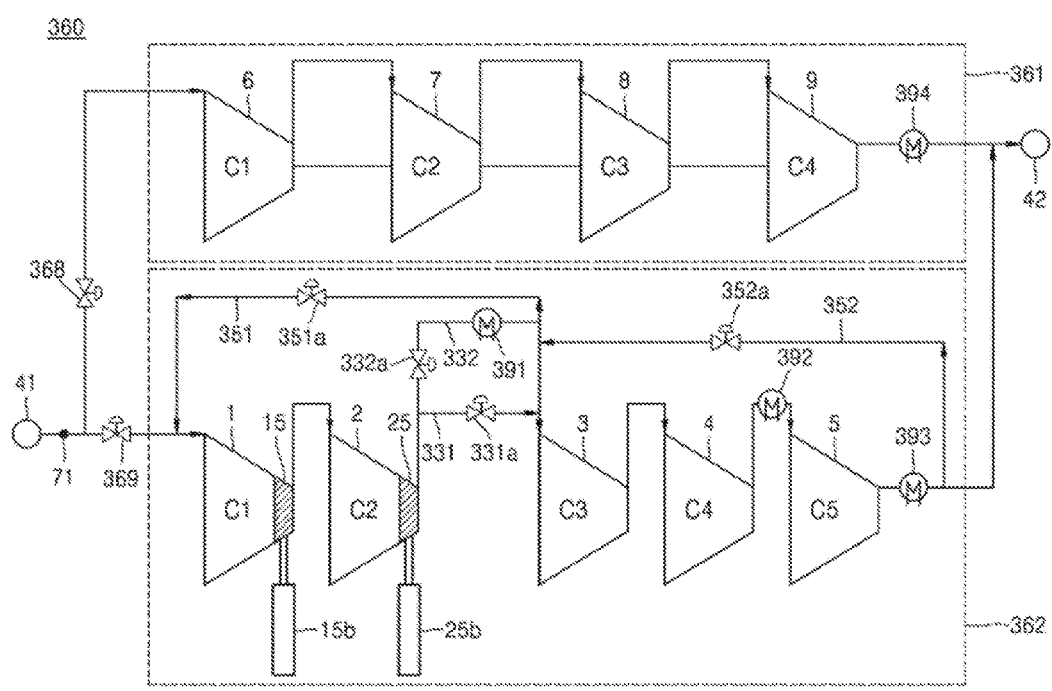
FIG. 6 shows a circuit diagram illustrating a connection relationship of components included in another example of a compressor system that is applicable to the fuel supply system of FIG. 3 and different from the compressor systems illustrated in FIGS. 4 and 5.

FIG. 6 shows a circuit diagram illustrating a connection relationship of components included in a compressor system 360 that is applicable to the fuel supply system 100 of FIG. 3 and is different from the compressor systems 160 and 260 illustrated in FIGS. 4 and 5. FIG. 6 does not show a controller. However, in the exemplary embodiment, the same controller as explained in connection with FIGS. 1 and 2 may be used to control valves and drivers of the compressor system 360.

The compressor system 360 of FIG. 6 includes a first compressing device 362 and a second compressing device 361. The configuration of the first compressing device 362 is the same as the configuration of a compressor system according to the exemplary embodiment illustrated in FIG. 2. The second compressing device 361 is constructed as a 4-stage compressor including first stage C1 through fourth stage C4, and is different from the first compressing device 362.

The first compressing device 362 is engaged in a compression operation of each of the first stage C1 through the fifth stage C5, and includes the first compressor 1, the second compressor 2, the third compressor 3, the fourth compressor 4, and the fifth compressor 5, which are connected in series with respect to the flow of fluid.

The second compressing device 361 is engaged in a compression operation of each of the first stage C1 through the fourth stage C4, and includes the sixth compressor 6, the seventh compressor 7, the eighth compressor 8, and the ninth compressor 9, which are connected in series with respect to the flow of fluid.

In the first compressing device 362, the first compressor 1 and the second compressor 2 include a first variable diffuser 15 and a second variable diffuser 25, respectively. The first variable diffuser 15 and the second variable diffuser 25 are driven by drivers 15*b* and 25*b*, respectively.

In the first compressing device 362, a first valve 331*a* is provided to a first channel 331 connecting an outlet of the second compressor 2 to an inlet of the third compressor 3 to open or close the first channel 331. A second valve 332*a* and a first intercooler 391 are provided to a second channel 332 connecting the outlet of the second compressor 2 to the inlet of the third compressor 3 in parallel to the first channel 331.

In the first compressing device 362, a second intercooler 392 is disposed between an outlet of the fourth compressor 4 and an inlet of the fifth compressor 5.

In the first compressing device 362, a first surge valve 351*a* is provided to a first surge channel 351 connecting the inlet of the third compressor 3 to an inlet of the first compressor 1 to open or close the first surge channel 351. A second surge valve 352*a* is provided to a second surge channel 352 connecting an outlet of the fifth compressor 5 to the inlet of the third compressor 3 to open or close the second surge channel 352.

In the first compressing device 362, a first after-cooler 393 is connected to the outlet of the fifth compressor 5. In the second compressing device 361, a second after-cooler 394 is connected to an outlet of the ninth compressor 9. The first after-cooler 393 and the second after-cooler 394 cool BOG discharged by the fifth compressor 5 and the ninth compressor 9 to a temperature that is suitable for use in an engine. The BOG cooled and discharged by the first after-cooler 393 and the second after-cooler 394 is delivered to a fuel supplier 42 that supplies fuel to an engine.

Although not illustrated in FIG. 6, an intercooler may be located between the sixth compressor 6 through the ninth compressor 9, and if needed, a channel and a valve which prevent a surge may be provided to the sixth compressor 6 through the ninth compressor 9.

When a first selection valve 368 is open, a collector 41 that has collected BOG generated in an LNG storage tank supplies BOG to the first compressing device 362, and in this regard, a second selection valve 369 remains closed. On the other hand, when the second selection valve 369 is open, the collector 41 supplies BOG to the second compressing device 361, and in this regard, the first selection valve 368 remains closed.

Accordingly, a controller (not shown) may optionally drive the first compressing device 362 and the second compressing device 361 by controlling actuation of the first selection valve 368 and the second selection valve 369 based on the temperature of BOG detected by the sensor 71.

The first compressing device 362 is used during a laden voyage. The first compressing device 362 may be utilized when the inlet of the first compressor 1 has an extremely low temperature range of −140 degrees Celsius to −90 degrees Celsius.

The second compressing device 361 is used during a ballast voyage. The second compressing device 361 may be utilized when the inlet of the sixth compressor 6 has a temperature range of −84 degrees Celsius to +35 degrees Celsius including room temperature.

As described above, the first compressing device 362 is operated only in the extremely low temperature range, and when the first compressing device 362 breaks down, the second compressing device 361 may be operated instead of the first compressing device 362.

When the second compressing device 361 breaks down, in a temperature range of −84 degrees Celsius to +20 degrees Celsius including room temperature, the first compressing device 362 may be controlled such that the first compressing device 362 outputs fluid having a pressure of about 12 barA, which is a minimum value of pressure required by an engine. In the case in which the output of the engine needs to be increased, the forced vaporizer 103 illustrated in FIG. 3 may be driven to satisfy output requirements for the engine. In a temperature range of −20 degrees Celsius to +35 degrees Celsius, the gas combustion unit 105 illustrated in FIG. 3 may be driven to combust BOG or to drive the forced vaporizer 103.

As described above, in the compressor system 360, in an extremely low temperature range, the first compressing device 362 is driven, and in a temperature range including room temperature, the second compressing device 361 is driven. Accordingly, even without a separate cooling device, a compressor system that is smoothly operable in a wide temperature range may be constructed.

In the compressor systems according to exemplary embodiments described above, a compressor corresponding to the first stage C1 and a compressor corresponding to the second stage C2 each include a variable geometry diffuser. However, it may be understood that the configurations of the exemplary embodiments are not limited thereto. Accordingly, for example, even a compressor corresponding to the third stage C3 may include a variable geometry diffuser.

The compressor systems according to exemplary embodiments described above may compress fluid into a higher-pressure fluid through a five (5) or more-compression stage. Accordingly, when the compressor systems are used, BOG is compressed to provide high-pressure fuel to an engine of a LNG carrier.

Because a variable geometry diffuse and a surge valve are provided to some of compressors included in a compressor system, the occurrence of a compressor surge may be prevented, and in response to the change in the temperature of BOG, an overall operational condition of the compressor system may be efficiently controllable.

Also, because in a compressor system, a first compressing device is operable in an extremely low temperature range and a second compressing device is operable in a low temperature range including room temperature, even without a separate cooling device at an inlet of a compressor, a compressor system that is smoothly operable in a wide temperature range may be constructed.

In addition, when a compressor system, in which a first compressing device having five (5) or more compression stages and a second compressing device having five (5) or more compression stages are aligned in parallel, is used, components of the first compressing device may be designed to be the same as those of the second compressing device. Accordingly, compatibility during maintenance may be maximized.

Furthermore, when a first compressing device having five (5) or more compression stages and a second compressing device having five (5) or more compression stages are aligned in parallel, and the first compressing device and the second compressing device share components, such as an intercooler or an after-cooler, the space for installation may be minimized and capital expenditure may be reduced.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope as defined by the following claims.

What is claimed is:

1. A compressor system comprising:
   a first compressor comprising a first variable diffuser having a diffuser area which varies in size based on an external signal, and configured to compress boil-off gas;
   a second compressor comprising a second variable diffuser having a diffuser area which varies in size based on an external signal and configured to compress fluid discharged by the first compressor;
   a third compressor configured to compress fluid discharged by the second compressor;
   a fourth compressor configured to compress fluid discharged by the third compressor;
   a fifth compressor configured to compress fluid discharged by the fourth compressor;
   a first channel configured to connect an outlet of the second compressor to an inlet of the third compressor;
   a first valve provided to the first channel and configured to open or close the first channel based on an external signal;
   a second channel configured to connect the outlet of the second compressor to the inlet of the third compressor;
   a second valve provided to the second channel and configured to open or close the second channel based on an external signal;
   a first intercooler provided to the second channel and configured to cool fluid passing through the second channel;
   a second intercooler provided between an outlet of the fourth compressor and an inlet of the fifth compressor and configured to cool the fluid discharged by the fourth compressor;
   a controller configured to control the first valve, the second valve, the first variable diffuser, and the second variable diffuser;
   a first surge channel connecting an outlet of the fifth compressor to the inlet of the third compressor, and
   a first surge valve provided to the first surge channel and configured to open or close the first surge channel based on an external signal.

2. The compressor system of claim 1, further comprising a second surge channel connecting the inlet of the third compressor and an inlet of the first compressor, and
   a second surge valve provided to the second surge channel and configured to open or close the second surge channel based on an external signal.

3. The compressor system of claim 1, further comprising an after-cooler connected to the outlet of the fifth compressor and configured to cool fluid discharged by the fifth compressor.

4. The compressor system of claim 1, further comprising a sensor configured to detect temperature of the boil-off gas supplied to the first compressor.

5. The compressor system of claim 1, further comprising a sixth compressor configured to compress fluid discharged by the fifth compressor.

6. A compressor system comprising:
   a first compressing device comprising
      a first compressor comprising a first variable diffuser, of which a metering area is varied based on an external signal, and configured to compress boil-off gas, a second compressor comprising a second variable diffuser, of which a metering area is varied based on an external signal, and configured to compress fluid discharged by the first compressor, a third compressor, a fourth compressor, and a fifth compressor which are sequentially disposed in series at a downstream side of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and configured to cool fluid passing through the second compressor, and a second intercooler provided between an outlet of the fourth compressor and an inlet of the fifth compressor and configured to cool fluid passing through the fourth compressor;

a second compressing device comprising:

a sixth compressor comprising a third variable diffuser, of which a metering area is varied based on an external signal, and configured to compress boil-off gas, a seventh compressor comprising a fourth variable diffuser, of which a metering area is varied based on an external signal, and configured to compress fluid discharged by the sixth compressor, an eighth compressor, a ninth compressor, and a tenth compressor which are sequentially disposed in series at a downstream side of the seventh compressor, a third valve configured to open or close a third channel connecting an outlet of the seventh compressor to an inlet of the eighth compressor, a fourth valve configured to open or close a fourth channel connecting the outlet of the seventh compressor to the inlet of the eighth compressor, a third intercooler provided to the fourth channel and configured to cool fluid passing through the seventh compressor, and a fourth intercooler provided between an outlet of the ninth compressor and an inlet of the tenth compressor and configured to cool fluid passing through the ninth compressor;

a controller configured to control the first valve, the second valve, the third valve, the fourth valve, the first variable diffuser, the second variable diffuser, the third variable diffuser, and the fourth variable diffuser;

a first surge channel connecting an outlet of the fifth compressor to the inlet of the third compressor, and a first surge valve provided to the second surge channel and configured to open or close the second surge channel based on an external signal.

7. The compressor system of claim 6, further comprising a second surge channel connecting the inlet of the third compressor and an inlet of the first compressor, and a second surge valve provided to the first surge channel and configured to open or close the first surge channel based on an external signal.

8. The compressor system of claim 6, further comprising a third surge channel connecting the inlet of the eighth compressor to an inlet of the sixth compressor, and a third surge valve provided to the third surge channel and configured to open or close the third surge channel based on an external signal.

9. The compressor system of claim 6, further comprising a fourth surge channel connecting an outlet of the tenth compressor to the inlet of the eighth compressor, and a fourth surge valve provided to the fourth surge channel and configured to open or close the fourth surge channel.

10. The compressor system of claim 6, further comprising a first after-cooler connected to an outlet of the fifth compressor and configured to cool fluid discharged by the fifth compressor.

11. The compressor system of claim 6, further comprising a second after-cooler connected to an outlet of the tenth compressor and configured to cool fluid discharged by the tenth compressor.

12. A compressor system comprising:

a first compressing device comprising a first compressor comprising a first variable diffuser, of which a metering area is varied based on an external signal, and configured to compress boil-off gas, a second compressor comprising a second variable diffuser, of which a metering area is varied based on an external signal, and configured to compress fluid discharged by the first compressor, a third compressor, a fourth compressor, and a fifth compressor which are sequentially disposed in series at a downstream side of the second compressor, a first valve configured to open or close a first channel connecting an outlet of the second compressor to an inlet of the third compressor, a second valve configured to open or close a second channel connecting the outlet of the second compressor to the inlet of the third compressor, a first intercooler provided to the second channel and configured to cool fluid passing through the second compressor, and a second intercooler located between an outlet of the fourth compressor and an inlet of the fifth compressor and configured to cool fluid passing through the fourth compressor;

a second compressing device comprising:

a sixth compressor comprising a third variable diffuser, of which a metering area is varied based on an external signal, and configured to compress boil-off gas, a seventh compressor comprising a fourth variable diffuser, of which a metering area is varied based on an external signal, and configured to compress fluid discharged by the sixth compressor, an eighth compressor, a ninth compressor, and a tenth compressor which are sequentially disposed in series at a downstream side of the seventh compressor, a third valve configured to open or close a third channel connecting an outlet of the seventh compressor to an inlet of the eighth compressor, and a fourth valve configured to open or close a fourth channel connecting the outlet of the seventh compressor to the inlet of the eighth compressor, a controller configured to control the first valve, the second valve, the third valve, the fourth valve, the first variable diffuser, the second variable diffuser, the third variable diffuser, and the fourth variable diffuser, a second surge channel connecting an outlet of the fifth compressor to the inlet of the third compressor, and a second surge valve provided to the second surge channel and configured to open or close the second surge channel based on an external signal, wherein one selected from the first intercooler and the second intercooler is connected to the fourth channel and configured to cool fluid passing through the seventh compressor, and the other one is connected between an outlet of the ninth compressor and an inlet of the tenth compressor and configured to cool fluid passing through the ninth compressor.

13. The compressor system of claim 12, further comprising
a second surge channel connecting the inlet of the third compressor to an inlet of the first compressor, and
a second surge valve provided to the first surge channel and configured to open or close the first surge channel based on an external signal.

14. The compressor system of claim 12, further comprising
a third surge channel connecting the inlet of the eighth compressor to an inlet of the sixth compressor, and
a third surge valve provided to the third surge channel and configured to open or close the third surge channel based on an external signal.

15. The compressor system of claim 12, further comprising
a fourth surge channel connecting an outlet of the tenth compressor to the inlet of the eighth compressor, and
a fourth surge valve provided to the fourth surge channel and configured to open or close the fourth surge channel based on an external signal.

16. A compressor system comprising:
a first compressing device comprising
    a first compressor comprising a first variable diffuser, of which a metering area is varied based on an external signal, and configured to compress boil-off gas,
    a second compressor comprising a second variable diffuser, of which a metering area is varied based on an external signal, and configured to compress fluid discharged by the first compressor,
    a third compressor, a fourth compressor, and a fifth compressor which are sequentially disposed in series at a downstream side of the second compressor,
    a first valve configured to open or close a first channel connecting an outlet of the second compressor to an inlet of the third compressor based on an external signal,
    a second valve configured to open or close a second channel connecting the outlet of the second compressor to the inlet of the third compressor based on an external signal,
    a first intercooler provided to the second channel and configured to cool fluid passing through the second compressor, and
    a second intercooler provided between an outlet of the fourth compressor and an inlet of the fifth compressor and configured to cool fluid passing through the fourth compressor;
a second compressing device comprising a sixth compressor, a seventh compressor, an eighth compressor and a ninth compressor connected in series, thereby configured to perform a four-stage compression operation, and configured to be parallel to the first compressing device;
a controller configured to control the first valve, the second valve, the first variable diffuser, and the second variable diffuser, and to control the first compressing device and the second compressing device according to a temperature range of the boil-off gas;
a first surge channel connecting an outlet of the fifth compressor to the inlet of the third compressor; and
a first surge valve provided to the second surge channel and configured to open or close the second surge channel based on an external signal.

17. The compressor system of claim 16, further comprising
a second surge channel connecting the inlet of the third compressor to an inlet of the first compressor; and
a second surge valve provided to the first surge channel and configured to open or close the first surge channel based on an external signal.

* * * * *